(12) United States Patent
Srinivasamurthy et al.

(10) Patent No.: US 7,814,457 B2
(45) Date of Patent: *Oct. 12, 2010

(54) SYSTEM AND METHOD FOR REVISING FLOW DIAGRAMS DISPLAYING A PROCESS

(75) Inventors: Guruprasad Srinivasamurthy, Cupertino, CA (US); Yue Fang, Mountain View, CA (US); Zhong Zhang, Los Altos, CA (US); Pavan Bayyapu, Sunnyvale, CA (US)

(73) Assignee: SAP AG, Walldorf (DE)

( * ) Notice: Subject to any disclaimer, the term of this patent is extended or adjusted under 35 U.S.C. 154(b) by 783 days.

This patent is subject to a terminal disclaimer.

(21) Appl. No.: 11/037,149

(22) Filed: Jan. 19, 2005

(65) Prior Publication Data
US 2006/0161900 A1 Jul. 20, 2006

(51) Int. Cl.
G06F 9/44 (2006.01)
G06F 15/177 (2006.01)
(52) U.S. Cl. ...................... 717/100; 715/735
(58) Field of Classification Search ............... 717/105, 717/109, 113, 125, 132, 100
See application file for complete search history.

(56) References Cited

U.S. PATENT DOCUMENTS

| | | | | |
|---|---|---|---|---|
| 6,028,997 A * | 2/2000 | Leymann et al. | ............ | 717/104 |
| 6,144,962 A * | 11/2000 | Weinberg et al. | ............. | 707/10 |
| 7,051,069 B2 * | 5/2006 | Smithline et al. | ........... | 709/203 |
| 7,096,222 B2 * | 8/2006 | Kern et al. | ............ | 1/1 |
| 7,159,183 B1 * | 1/2007 | Kudukoli et al. | ............ | 715/762 |
| 7,200,838 B2 * | 4/2007 | Kodosky et al. | ............ | 717/116 |
| 7,206,730 B2 * | 4/2007 | Pochayevets et al. | .......... | 703/14 |
| 7,210,117 B2 * | 4/2007 | Kudukoli et al. | ............ | 717/100 |
| 7,266,807 B2 * | 9/2007 | Takano et al. | ............... | 717/111 |
| 7,428,705 B2 * | 9/2008 | Ronald et al. | ............... | 715/738 |
| 7,434,203 B2 * | 10/2008 | Stienhans et al. | ........... | 717/120 |
| 7,606,820 B2 * | 10/2009 | Stienhans et al. | .................. | 1/1 |
| 2002/0091990 A1 * | 7/2002 | Little et al. | ................. | 717/105 |
| 2003/0005104 A1 * | 1/2003 | Deboer et al. | ............... | 709/223 |
| 2003/0034998 A1 * | 2/2003 | Kodosky et al. | ............ | 345/736 |
| 2003/0167455 A1 * | 9/2003 | Iborra et al. | ................ | 717/105 |
| 2003/0233343 A1 * | 12/2003 | Li | ................. | 707/1 |
| 2004/0019873 A1 * | 1/2004 | Pochayevets et al. | ........ | 717/101 |
| 2004/0133876 A1 * | 7/2004 | Sproule | ...................... | 717/105 |

(Continued)

OTHER PUBLICATIONS

Zeinalipour-Yazti et al. "Design and Implementation of a Distributed Crawler and Filtering Processor", 2002, retrieved from <http://citeseerx.ist.psu.edu/viewdoc/summary?doi=10.1.1.13.5836>, pp. 1-17.*

Rayside et al., "Visualizing Flow diagram in WebSphere Studio Using SHriMP Views", 2003, retrieved from <http://www.springerlink.com/content/x09707x829375654/fulltext.pdf>, Total pages: 14.*

(Continued)

Primary Examiner—Tuan Q Dam
Assistant Examiner—Marina Lee
(74) Attorney, Agent, or Firm—Kenyon & Kenyon LLP

(57) ABSTRACT

Embodiments of the present invention implement a method and system that revise a flow diagram of a selected process of a plurality of processes. The plurality of processes are displayed in a first portion of a screen, and the flow diagram of the selected process is displayed in a second portion of the screen. A user selection of portions of the process flow to be revised is received and the selected portions of the process flow in the second portion of the screen are revised.

21 Claims, 10 Drawing Sheets

U.S. PATENT DOCUMENTS

2004/0205594 A1* 10/2004 Arora et al. .................. 715/513
2005/0033732 A1*  2/2005 Chang et al. .................... 707/2
2006/0085492 A1*  4/2006 Singh et al. .................. 707/203
2006/0085681 A1*  4/2006 Feldstein et al. ............... 714/25
2006/0206856 A1*  9/2006 Breeden et al. ............. 717/101

OTHER PUBLICATIONS

David Chappell, Introducing Microsoft Windows Workflow Foundation: An Early Look, Aug. 2005, retrieved from <http://msdn.microsoft.com/en-us/library/aa480215.aspx>,Total pages: 19.*

* cited by examiner

SYSTEM AND METHOD FOR REVISING FLOW DIAGRAMS DISPLAYING A PROCESS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

In today's complex software environment, information may be represented in a myriad of different formats, each of which define a particular arrangement of data that can be processed and/or stored by a computer. In some computing environments, it is desirable to represent information in a process or flow. Any particular computing process can be represented in a flow diagram for easier visual comprehension of the flow of the particular process. For example, a login process could be represented in a flow diagram such that the various steps of the process are easy to visualize.

Such processes are often configured within software in a computer in particular types of files. For example, the process may be configured within a series of configuration files. The files may also be configured in other types of files, such as application files, or in a combination of different types of files, such as in a combination of configuration and application files.

These types of files defining the flow of a particular process are often numerous, and can be difficult to work with, particularly for a user who is not an expert with such computer processes. Working with the flow of such a process can be very difficult when all one has to work with is such configuration and application files. Further, modifying such files can also be difficult, particularly for the non-expert user. Where such processes are complicated and difficult to visualize, it can be difficult for a user to simplify such displayed processes.

Accordingly, there is a need in the art for an improved system and method for taking such process files and automatically displaying such files in a flow diagram format that is easy to visualize and use. There is a further need for allowing a user to easily revise a displayed flow of such a process.

DETAILED DESCRIPTION

Embodiments of the present invention implement a method and system that revise a flow diagram of a selected process of a plurality of processes. The plurality of processes are displayed in a first portion of a screen, and the flow diagram of the selected process is displayed in a second portion of the screen. A user selection of portions of the process flow to be revised is received and the selected portions of the process flow in the second portion of the screen are revised.

Figure 1:
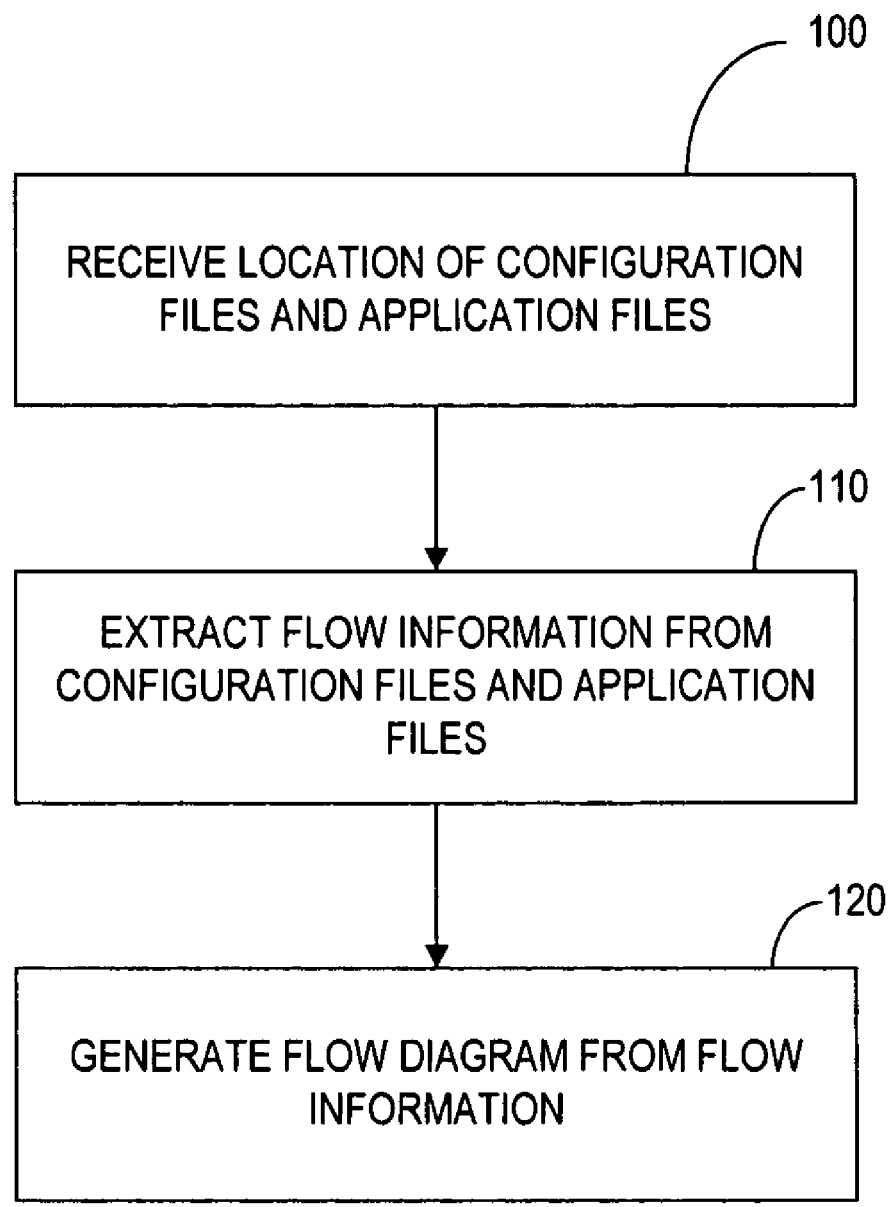
FIG. 1 is a flowchart illustrating a process in accordance with an embodiment of the present invention.

FIG. 1 depicts a process in accordance with an embodiment of the present invention. In step 100, an indication of a location of the configuration files and the application files is received. As further explained below, this indication may be input by a user that wants to automatically generate a flow diagram of the process flow between configuration files and application files for a process that has been predefined.

In step 110, flow information is extracted from the configuration files and from the application files. Details of the extraction of the flow information from the configuration files and application files are further discussed below. The flow information is information contained in the configuration files and in the application files that indicates one or more destination nodes from the configuration or application file and/or a flow label. The flow information may include flow labels and/or flow destinations.

In step 120, the flow diagram displaying a process flow between the configuration files and the application files is then generated from the flow information. The generated flow diagram and the method used to generate it are further explained below in conjunction with FIGS. 2 and 3.

Figure 2:
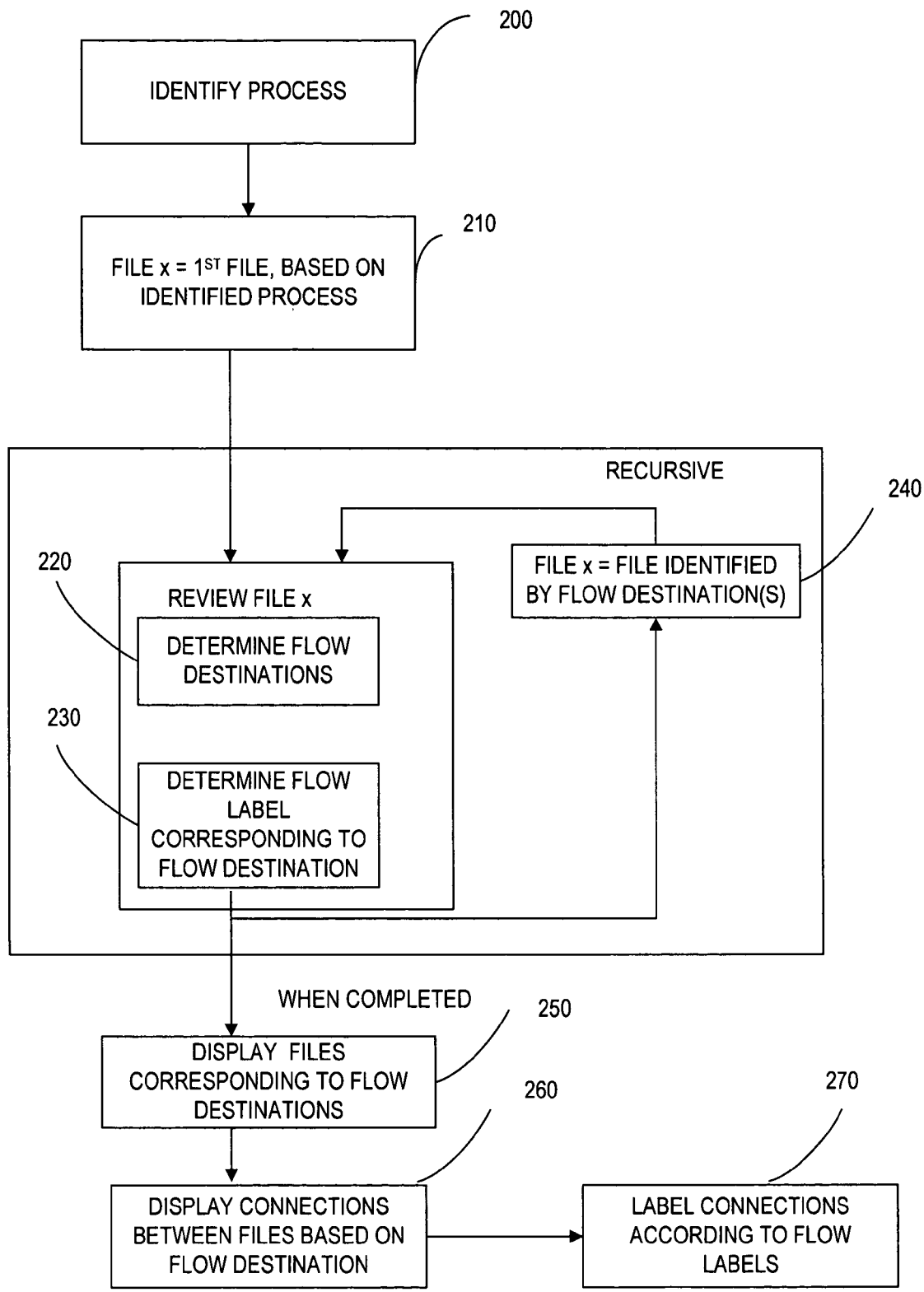
FIG. 2 is a flowchart illustrating a process in accordance with an embodiment of the present invention.

FIG. 2 illustrates a process in accordance with an embodiment of the present invention. In step 200, a process is identified by receipt of the indication of the location of the file or by other means. Each process may have one or a plurality of configuration or application files associated with it. For each file x, the present invention may process the files to determine flow destinations and/or flow labels.

In step 210, a first file in the process is identified. The flow destination for the file is determined in step 220, and the flow label (if any) is determined in step 230, as further described below. In 240, the flow destination may be used to identify additional files, and steps 220 and 230 of determining the additional flow destinations and/or flow labels will continue until all destinations and labels in the process are determined.

Figure 3:
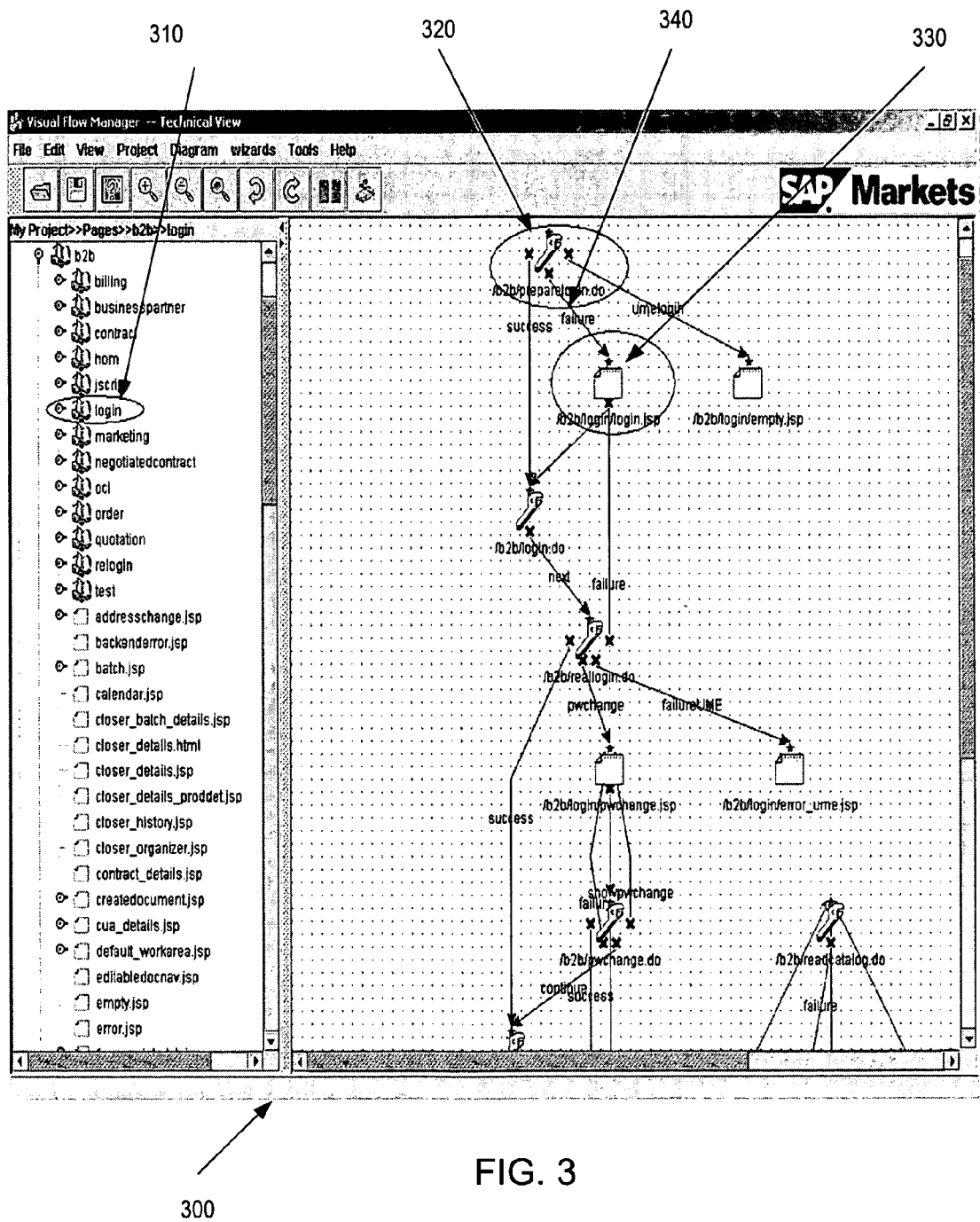
FIG. 3 is a screenshot of a flow diagram in accordance with an embodiment of the present invention.

When all of the flow destinations and/or flow labels are determined, the files may be displayed along with the corresponding flow destinations in step 250. In step 260, the connections between the files may be displayed based on the determined flow destinations. In step 270, the connections may be labeled according to the flow labels. These steps are further illustrated below FIG. 3 illustrates a flow diagram 300 that has been generated in accordance with an embodiment of the present invention. The flow diagram 300 has been generated in accordance with a predefined login process that includes application files and configuration files. The flow diagram 300 that is illustrated in FIG. 3 is a flow of a login process 310. The flow diagram 300 illustrates configuration files, application files, and the flow of the process between them. In the flow diagram 300, spanner wrench icons are used to represent configuration files and document icons are used to represent application files, although any type of icon may be used. A configuration file is represented in the flow diagram by the spanner wrench 320 labeled "/b2b/preparelogin.do". This icon could correspond to the following configuration entries in config.xml:

```
<action path="/b2b/preparelogin"
type="com.sapmarkets.isa.isacore.action.b2b.PrepareLoginAction">
    <forward name="success" path="/b2b/login.do"/>
    <forward name="umelogin" path="/b2b/login/empty.jsp"/>
    <forward name="failure" path="/b2b/login/login.jsp"/>
</action>
```

Flow labels and flow destinations are information that may be extracted from the configuration file for use in generating the flow diagram in accordance with embodiments of the present invention. In the particular example shown above, three labels, "success", "failure" and "umelogin" are extracted from the configuration file. Also, three corresponding flow destinations are extracted, namely "/b2b/login.do", "/b2b/login/empty.jsp" and "/b2b/login/login.jsp". The flow label 340 illustrated in FIG. 2 is labeled "failure". The flow destination 330 is labeled "/b2b/login/login.jsp". The flow labels and flow destinations are useful for a user in visualizing the flow of the process.

The flow destination 330 "/b2b/login/login.jsp" is an application file, which in this case is a .jsp file. Other types of application files could also be used, such as HTML (HyperText Markup Language) files. The application files also have flow information extracted from them as described above. The "/b2b/login/login.jsp" application file may include:

```
<form method="POST" action='<isa:webappsURL
name="b2b/login.do"/>'
name="login_form"
    onSubmit="return checkFields( )">
```

This application file is tokenized to extract the flow destination. This is accomplished by breaking the .jsp file from a long character stream into small parts (tokens), from which the flow destination and any flow labels may be extracted. For example, this may be accomplished by breaking the web page file from a long character stream into a series of small meaningful parts (tokens), so it is easy to operate on. In the example, the following line from a application file may be broken into a series of tokens:

```
<form action='<isa:webappsURL name="b2b/log-
    in.do"/>' name="loginForm">
``` may be broken into ["form", "action", "isa:webappsURL", "name", "b2b/login.do", "name", "loginForm"]. This may be done by using Java's (or some other language's) string operation library. Then the flow destinations can be extracted from those tokens. To achieve this, a coding standard may be used, such as SAP Internet Sales application's web page source file, where all the links are encapsulated by a specific tag (a common approach among business level internet applications). Other coding standards could also be used. The tokens are searched for that correspond to that specific tag, for example, the "isa:webappsURL" token, and then the following token is extracted as the flow destination. In this case, the flow destination "b2b/login.do" is extracted for use in creating the flow diagram. This particular destination does not include a label, but in examples where a label is used, the label is also extracted.

The flow information may be extracted from the configuration files by known techniques. For example, a standard XML package may be used for extraction, such as DOM (Document Object Model) or SAX (Simple API for XML) which are widely available and known. These XML packages may be used to parse the flow information from the files.

The present invention may use any number of application files and configuration files to generate a flow diagram, depending upon the complexity of the process. The application files may be of various types other than the .jsp files illustrated herein. The present invention may be used with a system having stored therein a large number of such processes that each can be used to generate such a flow diagram in accordance with the embodiment. For example, in addition to the "login" process 310 illustrated in FIG. 1, other processes are illustrated such as "billing", "businesspartner", etc. Each of these processes could be used to generate a flow diagram in accordance with embodiment of the invention.

Embodiments of the invention may be used with a plurality of processes, to generate a plurality of flow diagrams. The plurality of processes may be related, and even grouped together, such as, for example, in a common group or project.

Figure 4:
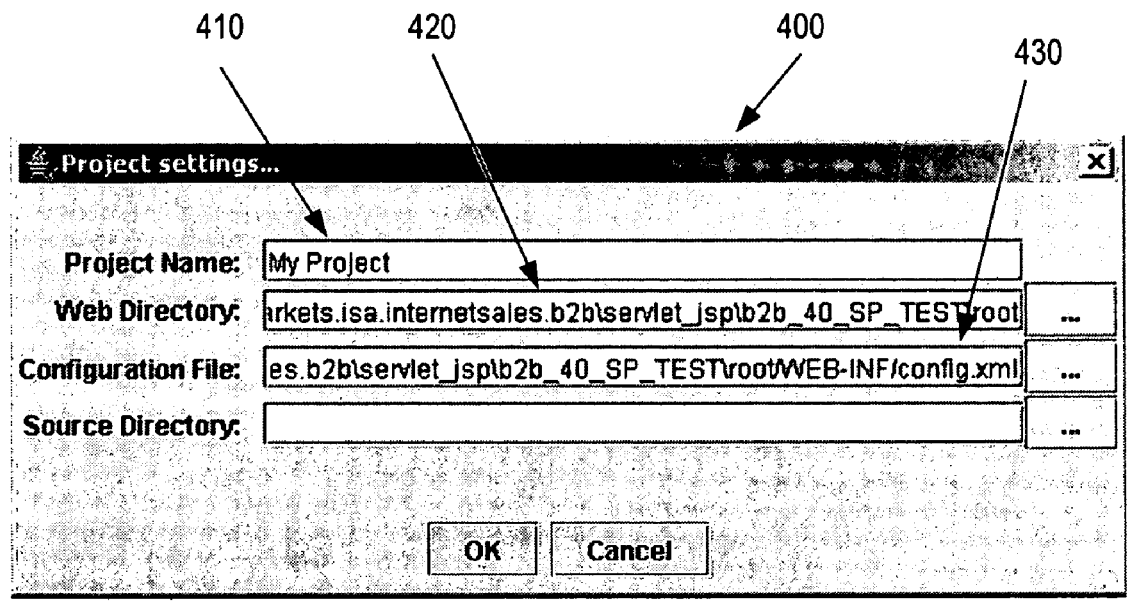
FIG. 4 is a screenshot in accordance with an embodiment of the present invention.

FIG. 4 illustrates a screen shot 400 that may be used in accordance with the present invention. The screen shot 400 includes a project name 410, an application file location 420 and a configuration file location 430. The screen shot 400 is generated to prompt a user to enter the location of application files and configuration files that the present invention will use to extract the flow information used to generate the flow diagram or diagrams. Alternatively, the screenshot 400 could be used to only require entry of the project name, and the location of the configuration files and application files could automatically be generated.

Embodiments of the present invention extract the flow destinations and flow labels for each configuration file and application file, and creates the flow diagram by generating an icon for the destinations, with arrows between each destination indicating the flow. The flow labels are associated with the corresponding arrow to show a result that will cause the process to move to a particular destination. Any type of icon or symbol may be used, and the icons shown herein are only ones of many possible examples that could be used. The flow diagrams may be rendered and displayed on a screen in any of many methods known to those of skill in the art.

The screenshot 400 is shown with the project name "My Project." As may be seen with reference to FIG. 2, the project "My Project" not only includes the "login" process, but also includes the various other processes such as "billing", "businesspartner", etc. Embodiments of the present invention can be used to simultaneously generate a plurality of flow diagrams for a plurality of processes within a project, or can be used to generate one or more flow diagrams for a single process. If a project includes a plurality of processes and it is desired to generate the flow diagrams for all of the processes, embodiments of the present invention will do so by receiving the location of the configuration files and application files, and extracting the flow information for each process. The extracted flow information is then associated with the corresponding process, so that the separate flow diagrams may be formed. If the flow information is not associated with a particular process, when a user wants to display the flow diagram for a process, any flows related to it may be dynamically formed.

Figure 5:
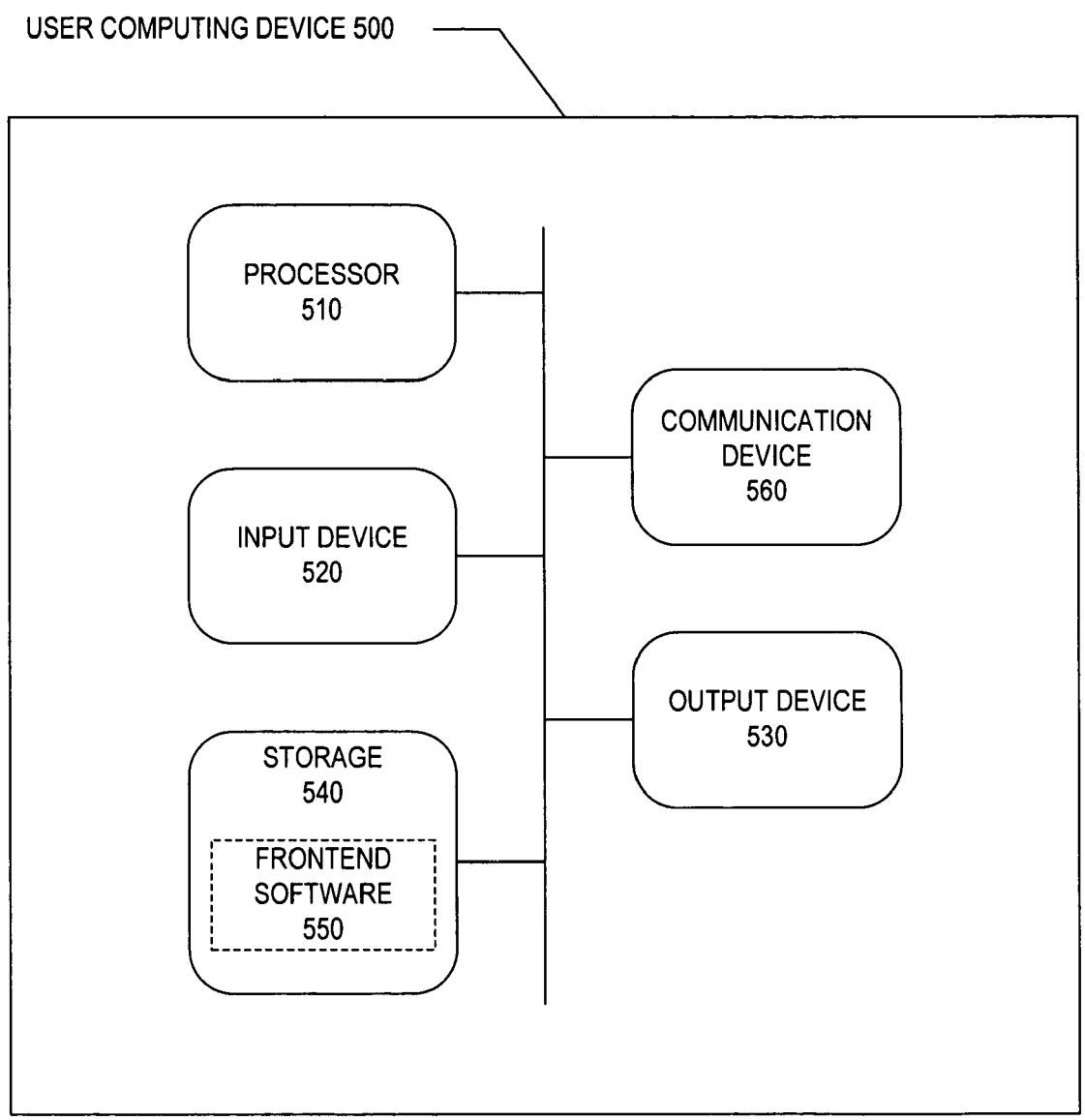
FIG. 5 is a block diagram that depicts a user computing device in accordance with an embodiment of the present invention.
Figure 6:
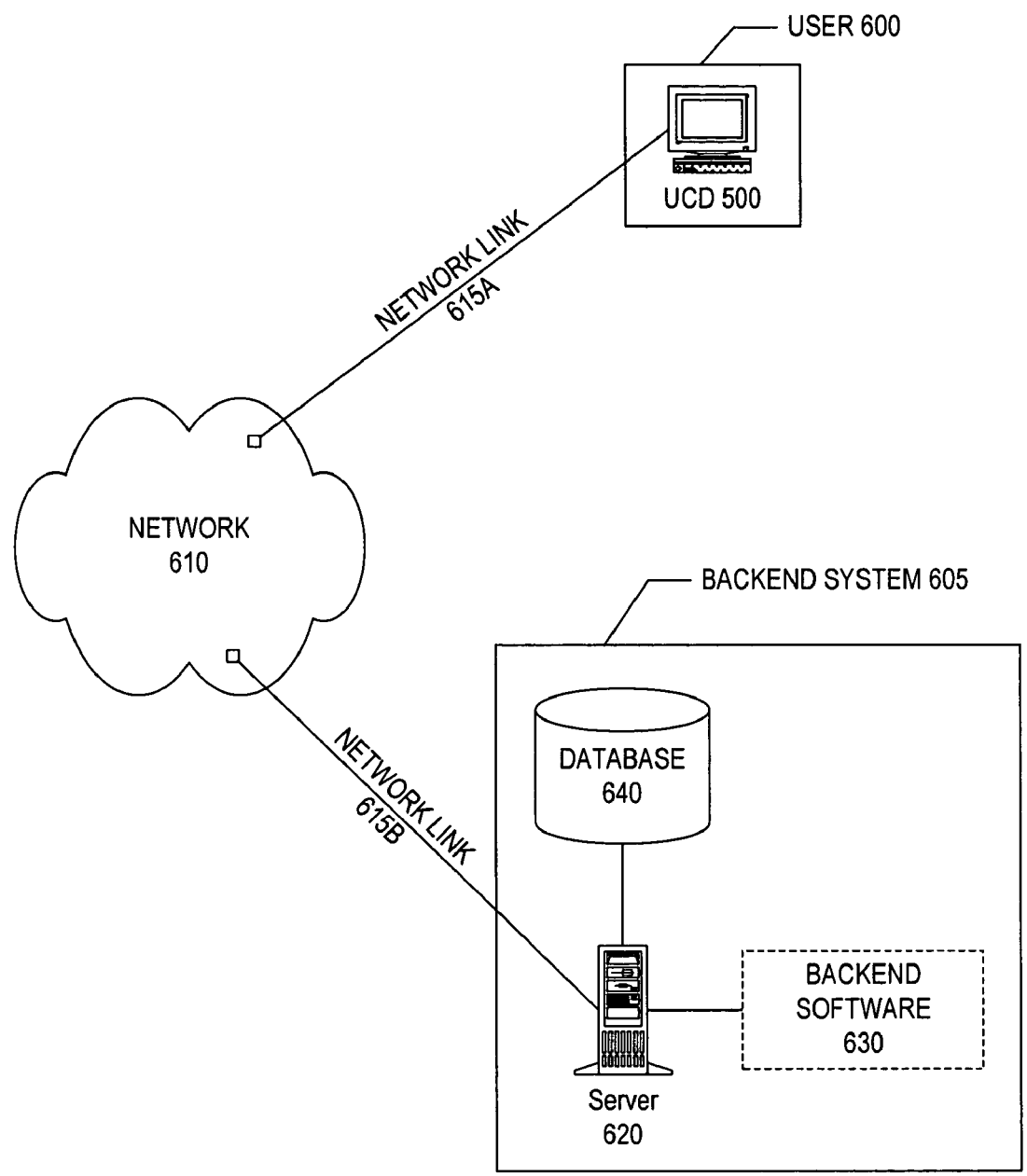
FIG. 6 is a block diagram that depicts a network architecture in accordance with an embodiment of the present invention.

FIGS. 5 and 6 illustrate the components of a basic computer and network architecture in accordance with an embodiment of the present invention. Embodiments of the present invention may not need all of the elements described herein. FIG. 5 depicts user computing device 500, which may be a personal computer, workstation, handheld personal digital assistant ("PDA"), or any other type of microprocessor-based device. User computing device 400 may include one or more of processor 510, input device 520, output device 530, storage 540, and communication device 560.

Input device 520 may include a keyboard, mouse, pen-operated touch screen or monitor, voice-recognition device, or any other device that provides input. Output device 530 may include a monitor, printer, disk drive, speakers, or any other device that provides output.

Storage 540 may include volatile and nonvolatile data storage, including one or more electrical, magnetic or optical memories such as a RAM, cache, hard drive, CD-ROM drive, tape drive or removable storage disk. Communication device 560 may include a modem, network interface card, or any other device capable of transmitting and receiving signals over a network. The components of user computing device 500 may be connected via an electrical bus or wirelessly.

Software 550, which may be stored in storage 540 and executed by processor 510, may include, for example, the client side of a client/server application that embodies the functionality of the present invention (e.g., automatically generating the flow diagrams). Thus software for executing the above-described functionality may be placed in storage 540 and executed by processor 510 to automatically generate the flow diagrams.

FIG. 6 illustrates a network architecture that could be used in accordance with an embodiment of the present invention. According to one particular embodiment, when user 600 invokes a client/server application hosted by Enterprise System 605, client software 650 of user computing device 600 communicates with server software 630 (e.g., the server side of the client/server application) of server 620 via network link 615a, network 610, and network link 615b. The server software 630 may perform the functionality of the present invention, where a user connects to the backend system via network 610, for example. In this embodiment, the flow diagrams could be generated in Server 620, and displayed at UDC 500.

Network links 615 may include telephone lines, DSL, cable networks, T1 or T3 lines, wireless network connections, or any other arrangement that implements the transmission and reception of network signals. Network 610 may include any type of interconnected communication system, which may implement any communications protocol, which may be secured by any security protocol.

Server 620 includes a processor and memory for executing program instructions as well as a network interface, and may include a collection of servers. In one particular embodiment, server 620 may include a combination of enterprise servers such as an application server and a database server. Database 640 may represent a relational or object database, and may be accessed via a database server.

User computing device 500 and server 620 may implement any operating system, such as Windows or UNIX. Client software 650 and server software 630 may be written in any programming language, such as ABAP, C, C++, Java or Visual Basic.

In other embodiments, application software embodying the functionality of the present invention may be deployed on a standalone machine or through a Web browser as a Web-based application or Web service, for example.

Figure 7:
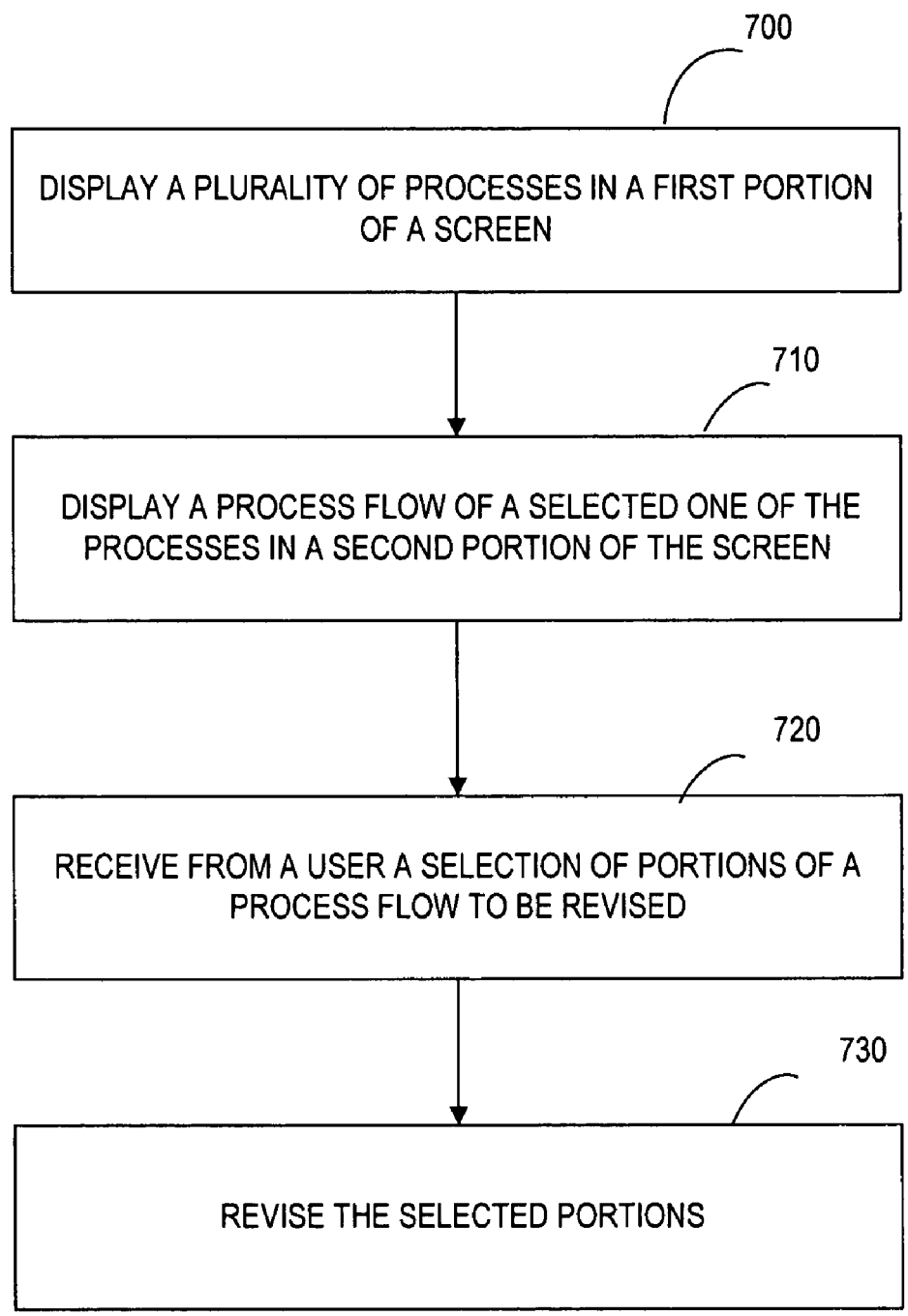
FIG. 7 is a flowchart illustrating a process in accordance with an embodiment of the present invention.

FIG. 7 depicts a process in accordance with an embodiment of the present invention. In step 700, a plurality of processes are displayed in a first portion of a screen. Each of the processes may be selectable by the user. Any method of selection may be useable, such as placing a cursor over the processes and clicking a doubleclicking. The processes may be displayed in a list form, or in another desired form. The processes may have sub-elements also displayed, as further described below.

In step 710, a flow diagram of a process flow of a selected one of the processes is displayed in a second portion of the screen. The user may select any of the processes from the first portion of the screen, and the corresponding flow diagram will be displayed in the second portion of the screen.

In step 720, the user may select portions of the process flow to be revised. As further explained below, various methods may be used to select the portions to be revised.

In step 730, the selected portions of the process flow are revised in the second portion of the screen. Further details of the revision of the selected portions are described below.

Figure 8:
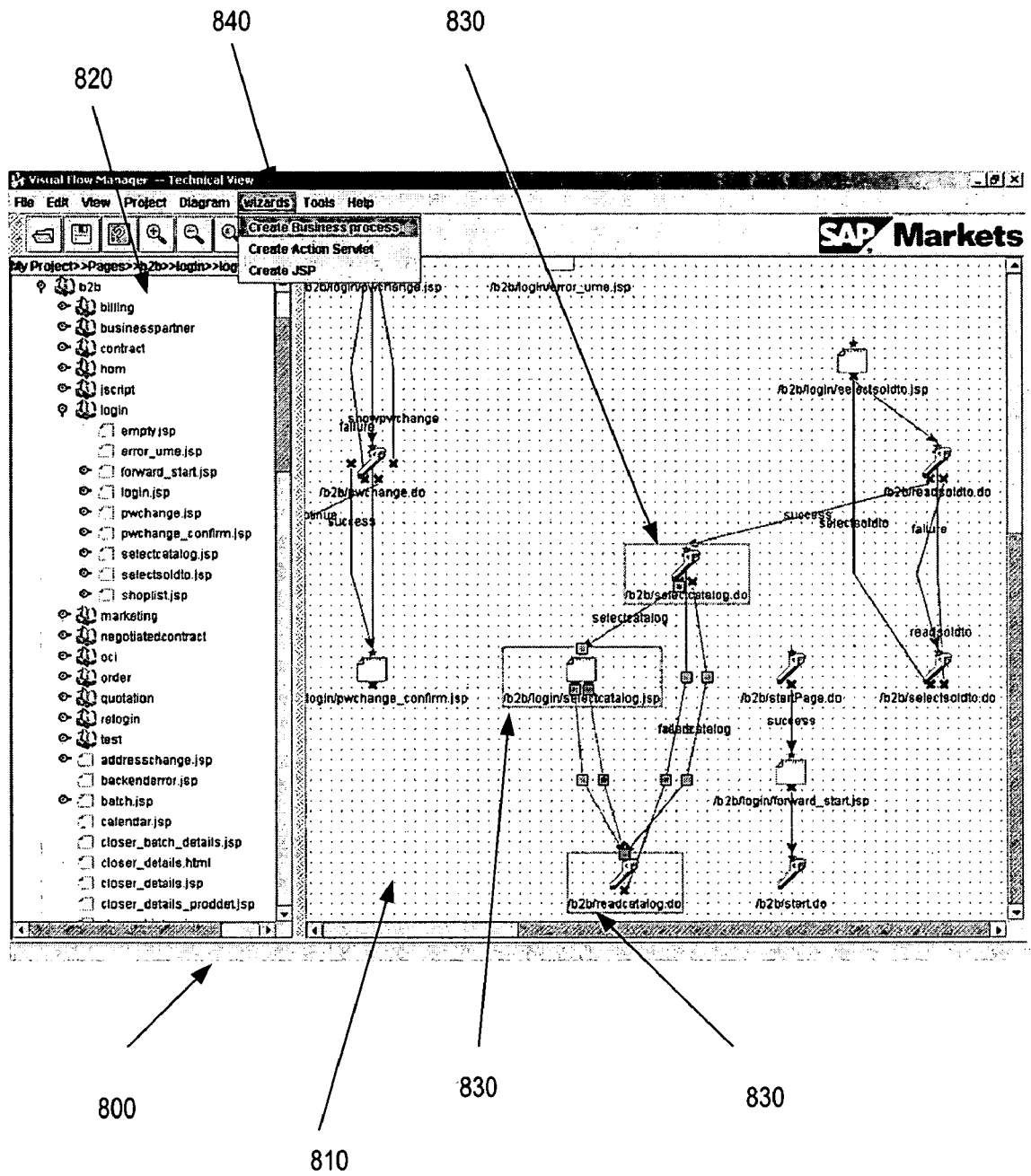
FIG. 8 is a screenshot in accordance with an embodiment of the present invention.

FIG. 8 illustrates a screenshot 800 in accordance with the present invention. The screenshot 800 includes an area 810 graphically displaying a process flow generated from configuration files and application files as explained above, and an area 820 displaying a plurality of processes used to generate such process flows. In this example, the area 820 displayed includes the following processes: billing, business-partner, contract, hom, jscript, login, marketing, negotiatedcontract, oci, order, quotation, relogin and test. Any number of such processes may be displayed, and additional processes may be included in portions of area 820 that can be viewed by user manipulation of screenshot 800.

Some of the processes may have associated application files or configuration files that define the process and may be displayed as a subset of the process. For example, the login process in area 820 includes a series of application files shown as associated with the login process. In the example in screenshot 800, the login process displayed in area 820 has a plurality of associated application files displayed as nested within the login process, including application files empty.jsp, error_ume.jsp, forward_start.jsp, login.jsp, pwchange.jsp, pwchange_confirm.jsp, selectcatalog.jsp, selectoldto.jsp and shoplist.jsp. Any number of such application files or configuration files may be displayed in association with a process. In the example of screenshot 800, configuration files are not shown, but would be shown in another area of the process.

Details of the "login" process are displayed in area 810. In the area 810 in screenshot 800, the login process is shown in a magnified view so that not all elements of the flow process are viewable without manipulation, but this is only one of many possible views. For example, by de-magnifying the view, all elements of the process may be viewable, or further magnification could be applied as desired. The flow diagram in area 810 illustrates configuration files, application files, and the flow of the process between them. In the flow diagram, spanner wrench icons are used to represent configuration files and document icons are used to represent application files as described above, although any type of icon may be used.

The login process, or any of the other processes, may be selected for display in area 810 by the user. For example, a user may be able to select one of the processes in area 820 for display in area 810 by a method such as placing a cursor on the desired process in area 820 and selecting the process by clicking or doubleclicking, although any selection method could be used.

The present invention allows the user to revise the flow diagram. For example, the user can create a new process from a subset of the configuration files and/or application files associated with a process. In particular, the present invention allows the user to select configuration files and/or application files, such as the configuration files and application files 830, to define a new process. The user may select the desired files by any method, such a placing a cursor on the desired files and clicking or doubleclicking. The user may select files for a newly defined process by use of a header, such as the "wizards" header 840 of FIG. 8, with the "create business process" subheader. Other ways of selecting the application files and/or configuration files to be used in a newly defined process could also be used with the present invention.

In the present example, before or after the user selects the "wizards" header and the "create business process" subheader, the user may select a plurality of configuration files and/or application files from those displayed in area 810 for inclusion in a user defined process by selecting the corresponding flow destinations. In the present example, the user has selected three files 830 for inclusion in a new user defined process. The three files selected in this example are the configuration file /b2b/selectcatalog.do, the application file /b2b/login/selectcatalog.jsp and the configuration file /b2b/readcatalog.do, which are shown as being selected in FIG. 8 as being included within rectangles. When the user selects the "Create business process" subheader, embodiments of the system and method of the present invention will initiate creation of a new user defined process, as further described below.

Figure 9:
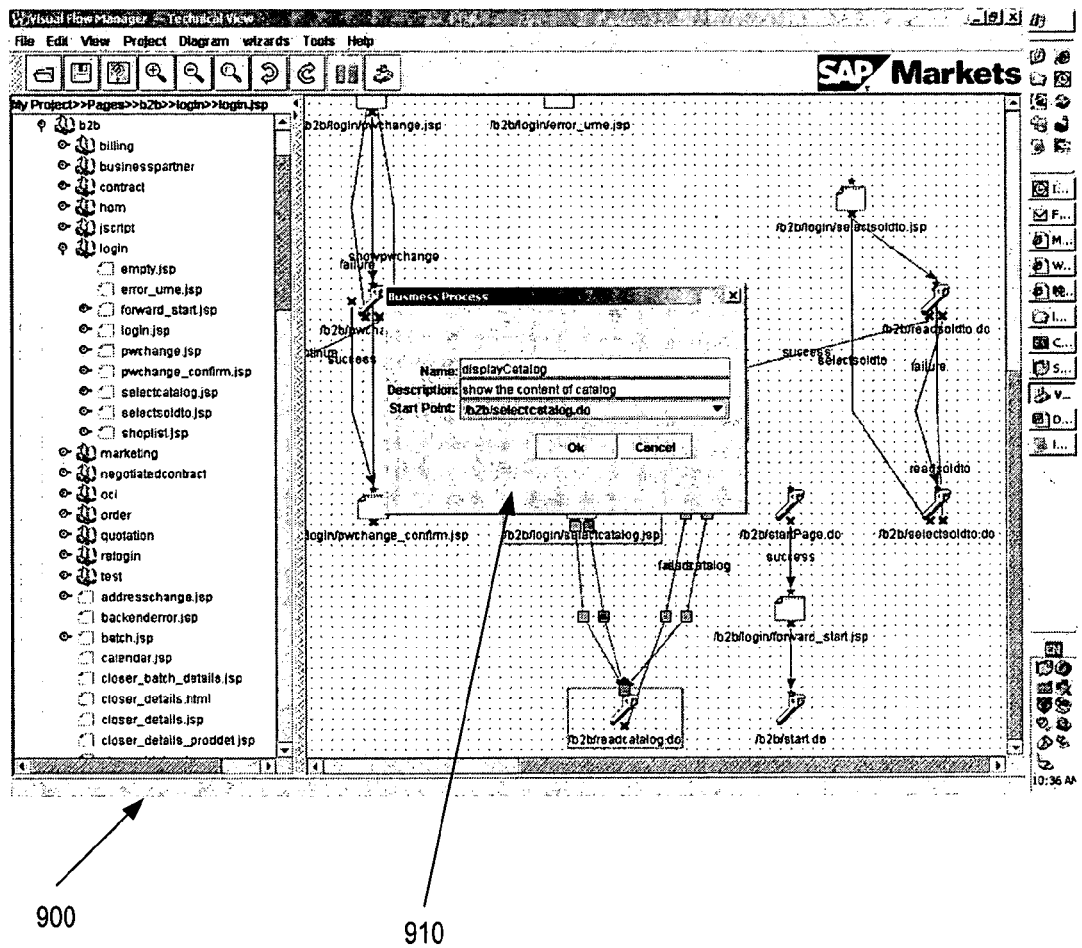
FIG. 9 is a screenshot in accordance with an embodiment of the present invention.

FIG. 9 illustrates a screenshot according to embodiments of the present invention. When the user selects the "Create business process" subheader, the present invention may ask the user for information about the new process. For example, the present invention may cause display of an item, such as the "Business Process" box 910 requesting information from the user. The requested information may include a name for the process, a description for the process and a start point for the process. After selection of the files for inclusion in the user defined process as shown in FIG. 8, the present invention may preload the selected files and display them for selection by the user, by means such as a drop down menu as shown in FIG. 9. In the present example, the three files that were selected in FIG. 8, the configuration file /b2b/selectcatalog.do, the application file /b2b/login/selectcatalog.jsp and the configuration file /b2b/readcatalog.do, may be preloaded for selection by the user in the drop down menu of box 910.

After the user has selected the files for inclusion in the process, the user may indicate to the system to proceed with the user defined process. This indication may occur in various ways, such as selection of the "Ok" button in the box 910 of FIG. 9. Upon receipt of the user indication to create the new process, the system will automatically create the user defined process. The flow diagram 810 of FIG. 8 will be automatically updated by the system to replace the flow destinations selected by the user for inclusion in the user defined process, as well as the connection between the flow destinations and any associated labels, with a new icon representing the user defined process.

Figure 10:
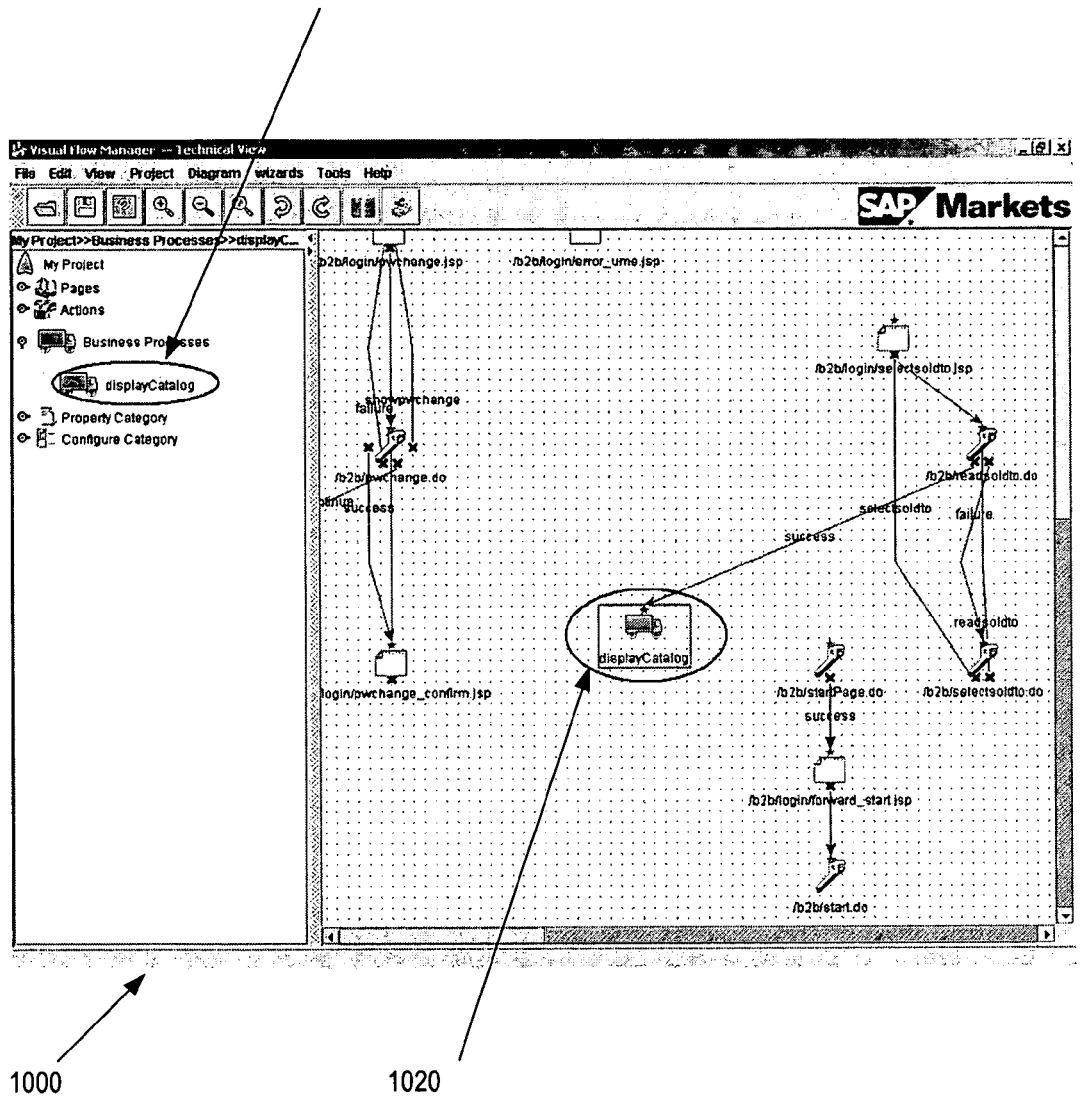
FIG. 10 is a screenshot in accordance with an embodiment of the present invention.

FIG. 10 illustrates a screenshot 1000 in accordance with embodiments of the present invention. Screenshot 1000 illustrates the flow diagram including new user defined process 1020 generated in response to the user indication to create the new process as described above in conjunction with FIGS. 8 and 9. The flow destinations for the three application and configuration files 830 of FIG. 8 have been replaced by a single icon representing the user defined process in the second area of the screen. If appropriate, this new flow diagram will include a connection between the user defined process (in this case "displayCatalog") and any flow destinations that should be connected according to the application and configuration files. In this example, there is a connection from the flow destination /b2b/readsoldto.do to the displayCatalog process, and the connection includes the label "success."

Thus, the present invention allows a user to take a flow diagram that may be relatively complex, and to simplify the flow diagram by creating a user defined process from a plurality of flow destinations, associated connections and associated labels. The system, upon receipt of user direction to create the new process, will then automatically revise the flow diagram to replace the plurality of flow destinations, associated connections and associated labels with a new icon indicating a user defined process. The icon representing the user defined process may be different from the be different from the spanner wrench and file icons used to represent the configuration files and application files, such as the illustrated "truck" icon.

Upon creation of the user defined process, the portion 820 of the display that had included a plurality of processes may be revised to show an icon representing the newly defined process. For example, the portion 820 of the display is revised in this example to display the newly defined process 1010 displayCatalog, as show in FIG. 10.

The invention disclosed in the above-described embodiments provides an easy to use system and method that allows a user to combine.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method comprising:
   displaying a plurality of business processes in a first portion of a display, each process to be defined by configuration files and application files;
   simultaneously displaying a flow diagram of a selected process of the plurality of processes in a second portion of the display, the flow diagram to include icons indicating a plurality of flow destinations representing the configuration files and application files of the selected process and flow direction indicators indicating a direction of flow for the selected process,
   wherein the displaying of the flow diagram of the selected process comprises extracting flow information from at least one of the configuration files and application files, identifying a first file based upon the extracted flow information, and reviewing the identified first file to determine a first of the flow destinations and a corresponding second file of the configuration and application files;
   receiving from a user a selection of a subset of the configuration files and/or application files, the subset including a plurality of configuration files and/or application files;
   for each subset file, automatically extracting flow destination and flow labels to other configuration and/or application files included in the subset and to other configuration and/or application files outside the subset;
   receiving from the user a start point selection, the start point being one of the flow destinations included in the subset;
   creating a new business process from the subset and the start point selection; and, in response to creation of the new business process, automatically revising the flow diagram in the second portion of the display by replacing flow destination icons corresponding to the subset and associated flow direction indicators with a single new icon that represents all subset files, wherein the revised flow diagram includes said extracted flow destination and flow labels connecting the new icon to said other configuration and/or application files outside the subset.

2. The method of claim 1, further comprising displaying sub-elements in association with at least one of the processes in the first portion of the display.

3. The method of claim 2, wherein the sub-elements comprise a list of configuration files and/or application files defining the associated process.

4. The method of claim 3, wherein the selection of the subset includes selecting configuration files and/or application files from the list on the first portion of the display.

5. The method of claim 1, wherein the selection of the subset includes selecting flow destination icons on the second portion of the display.

6. The method of claim 1, further comprising, upon receiving the selection of the subset, requesting from the user descriptive information of the new process.

7. The method of claim 1, further comprising displaying an icon indicative of the new process in the first portion of the display.

8. The method of claim 1, further comprising reviewing the first file to determine a first flow label corresponding to the first flow destination.

9. The method of claim 1, wherein the displaying of the flow diagram of the selected process comprises reviewing the second file to determine a second flow destination and a corresponding third file of the configuration and application files.

10. The method of claim 1, wherein the reviewing of the first file includes tokenizing information in the first file and extracting the first flow destination and the identity of the second file from the tokenized information.

11. The method of claim 10, wherein the tokenizing includes breaking a markup-language tag into a plurality of parts, and the extracting includes constructing the identity of the second file from a subset of the plurality of parts of the markup-language tag.

12. The method of claim 10, wherein the tokenizing includes processing the markup-language tag using a string operation library of a programming language.

13. The method of claim 1, wherein the configuration files and application files are stored in a database, the database associating the configuration files and application files with at least one of the plurality of processes.

14. An apparatus comprising:
a display;
a processor; and
a memory coupled to the processor, the memory storing instructions adapted to be executed by the processor to:
display a plurality of business processes in a first portion of a display, each process to be defined by configuration files and application files;
simultaneously display a flow diagram of a selected process of the plurality of processes in a second portion of the display, the flow diagram to include icons indicating a plurality of flow destinations representing the configuration files and application files of the selected process and flow direction indicators indicating a direction of process flow for the selected process,
wherein the displaying of the flow diagram of the selected process comprises extracting flow information from at least one of the configuration files and application files, identifying a first file based upon the extracted flow information, and reviewing the identified first file to determine a first of the flow destinations and a corresponding second file of the configuration and application files;
receive from a user a selection of a subset of the configuration files and/or application files, the subset including a plurality of configuration files and/or application files;
for each subset file, automatically extract flow destination and flow labels to other configuration and/or application files included in the subset and to other configuration and/or application files outside the subset;
receive from the user a start point selection, the start point being one of the flow destinations included in the subset;
create a new business process from the subset and the start point selection; and,
in response to creation of the new business process, automatically revise the flow diagram in the second portion of the display by replacing flow destination icons corresponding to the subset and associated flow direction indicators with a single new icon that represents all subset files,
wherein the revised flow diagram includes said extracted flow destination and flow labels connecting the new icon to said other configuration and/or application files outside the subset.

15. The apparatus of claim 14, wherein the instructions to display the plurality of processes in the first portion of the display comprise instructions to display sub-elements in association with at least one of the processes.

16. The apparatus of claim 15, wherein the sub-elements comprise a list of configuration files and/or application files defining the associated process.

17. The apparatus of claim 16, wherein the selection of the subset includes selecting configuration files and/or application files from the list on the first portion of the display.

18. The apparatus of claim 14, wherein the selection of the subset includes selecting flow destination icons on the second portion of the display.

19. The apparatus of claim 14, further comprising instructions adapted to be executed by the processor to request from the user descriptive information of the new process after receiving the selection of the subset.

20. The apparatus of claim 14, further comprising instructions adapted to be executed by the processor to display an icon indicative of the new process in the first portion of the display.

21. The apparatus of claim 14, wherein the configuration files and application files are stored in a database, the database associating the configuration files and application files with at least one of the plurality of processes.

* * * * *